(12) United States Patent
Malm et al.

(10) Patent No.: US 6,723,829 B1
(45) Date of Patent: Apr. 20, 2004

(54) HETEROPHASIC COPOLYMERS

(75) Inventors: Bo Malm, Espoo (FI); Pirjo Jääskeläinen, Porvoo (FI); Torvald Vestberg, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/129,834

(22) PCT Filed: Nov. 12, 1999

(86) PCT No.: PCT/FI99/00942

§ 371 (c)(1),
(2), (4) Date: Jun. 10, 2002

(87) PCT Pub. No.: WO01/36502

PCT Pub. Date: May 25, 2001

(51) Int. Cl.[7] .................................................. C08F 6/00

(52) U.S. Cl. ........................................................ 528/481
(58) Field of Search ......................................... 528/481

(56) References Cited

U.S. PATENT DOCUMENTS

| 5,741,862 A | 4/1998 | Muller et al. |
| 5,804,304 A | 9/1998 | Williams et al. |

*Primary Examiner*—Terressa M. Boykin
(74) *Attorney, Agent, or Firm*—Birch, Stewart, Kolasch & Birch, LLP

(57) ABSTRACT

Polypropylene heterophasic copolymers with good flow and impact properties are made by visbreaking a starting polypropylene heterophasic copolymer of which the amorphous rubber has an intrinsic viscosity of 2 dl/g or more and the ethylene content in the amorphous rubber, determined as $C_2$ of AM, is from 20 wt-% to 45 wt-%.

9 Claims, No Drawings

HETEROPHASIC COPOLYMERS

This application is the national phase under 35 U.S.C. §371 of PCT International Application No. PCT/FI99/00942 which has an International filing date of Nov. 12, 1999, which designated the United States of America.

FIELD OF THE INVENTION

The present invention relates to heterophasic copolymers, more particularly heterophasic copolymers of polypropylene, PP.

BACKGROUND OF THE INVENTION

PP heterophasic copolymers, also referred to as PP block copolymers, comprise a polymer matrix with a dispersed rubbery copolymer phase. The matrix is a homopolymer or random copolymer matrix. The rubbery copolymer phase is a reactor blend of an amorphous rubber, a rubber-like polymer which is normally an ethylene-propylene copolymer (rubber), and a semicrystalline ethylene copolymer.

The heterophasic copolymers are produced in two or more reactors. The matrix homopolymer or random copolymer may be produced by standard polymerisation with Ziegler-Natta catalyst system in one or more slurry or bulk (loop) reactors or gas phase reactors or combinations of both. In a second stage, the polymerisation is continued and the rubbery copolymer phase is produced in the matrix polymer using one or more gas phase reactors.

The composition of the rubbery phase is controlled in the second stage by the ethylene/propylene ratio and the amount of hydrogen. The comonomer ratio (CR) ethylene/propylene in mol/mol, which is otherwise expressed as $$CR=C_2/C_3$$

determines the rubbery copolymer composition. When CR is equal to or higher than 9, essentially ethylene copolymers are produced, and when CR is lower than around 0.1, essentially PP random copolymers are produced. Generally, the lower the CR, the less ethylene copolymers are present in the rubbery phase.

The amorphous rubber content is generally assessed by dissolving the polymer in xylene. The amount of xylene solubles, XS (weight-%) at room temperature (RT), corresponds to the amount of rubber. The rubber composition is defined by the ethylene content by weight-% in the xylene solubles, $C_2$ of AM, where AM is the with acetone precipitated amorphous rubber content in the xylene soluble fraction, at RT.

The hydrogen in the second stage controls the molecular weight of the rubber, generally measured as the intrinsic viscosity (IV) of the with acetone precipitated amorphous rubber fraction (AM) of the xylene soluble fraction. Intrinsic viscosity is measured in decaline at 135° C.

There is a continuing need for PP heterophasic copolymers with improved properties, notably materials with good flow and impact characteristics, especially for moulding, injection moulding, thin wall packaging and engineering applications.

PP heterophasic copolymers with a high melt flow rate, e.g. MFR>40 g/10 min, and with medium or high impact strength are difficult to produce directly by polymerisation with a Ziegler-Natta catalyst system. The difficulty arises because the matrix polymer of a heterophasic copolymer needs to have an MFR which is 50 to 100% higher than the MFR of the final copolymer. In turn this requirement means that very high hydrogen concentrations have to be used in the polymerisation of the matrix polymer. In many cases that is not possible. In addition a matrix with a very high MFR is very brittle which then affects the whole copolymer.

Heterophasic copolymers with very high amounts of rubber (XS>20 wt-%), so called super high impact copolymers or reactor-made thermoplastic olefin copolymers (rTPOs), are even more difficult to produce with high MFR.

Another known route to a high MFR product involves chemical treatment, i.e., visbreaking (peroxide treatment) of a molten PP heterophasic copolymer. The visbroken copolymer, also called a controlled rheology polymer, generally has low impact properties.

By visbreaking PP with heat or at more controlled conditions with organic peroxides the molar mass distribution, MWD, will be narrower because the long molecular chains are more easily broken up or scissored and the molar mass $M_w$ will decrease, corresponding to an MFR increase. The MFR increases with increase in the amount of peroxide which is used.

Because the molar mass distribution is narrower and the molar mass is decreased by visbreaking, the flowability will be improved (=controlled rheology). The narrower MWD also changes the mechanical properties of a polymer. For example, visbroken PP homopolymers and random copolymers have lower stiffness (tensile modulus, flexural modulus) and slightly higher impact properties than a standard PP homopolymer or random copolymer with the same MFR.

During visbreaking, ethylene polymers and copolymers are cross-linked by the peroxide. That means that the molar mass of the ethylene polymer will increase corresponding to a great drop in MFR. This is seen as gel formation and lack of flowability.

Visbreaking of PP heterophasic copolymer, the block copolymer, is more complicated because of the complex blend composition of homopolymer or random copolymer matrix, amorphous rubber and semicrystalline ethylene copolymer. Both the matrix polymer and the rubber decrease in molar mass, giving higher MFR, but the ethylene copolymers are cross-linked and then will cause problems in the PP copolymer.

This negative reaction results in flow problems, or gels. The mechanical properties, both stiffness and impact, drop. The visbreaking of a heterophasic copolymer to a certain MFR consumes more organic peroxide than visbreaking of a corresponding homopolymer to the same MFR, because of the negative reactions with the ethylene copolymer. The consumption of the expensive peroxide increases the more rubbery copolymer there is in the heterophasic copolymer, and the more PE rich is the rubbery copolymer.

The present invention addresses the need for PP heterophasic copolymers with good flow and impact characteristics.

SUMMARY OF THE INVENTION

According to the present invention, there is provided a method of preparing a polypropylene heterophasic copolymer with good flow and impact properties, which involves visbreaking a polypropylene heterophasic copolymer with an optimised rubber composition. The amorphous rubber has an intrinsic viscosity of 2 dl/g or more and the ethylene content in the rubber, determined as $C_2$ of AM is from 20 wt-% to 45 wt-%. The rubber should have a higher molecular mass than the matrix, $$IV_{rubber} > IV_{matrix}.$$

Thus, we have found that a heterophasic copolymer produced with an optimized rubber composition can be visbroken to high MFR materials without a significant loss of impact properties. The rubber needs to be produced with a low comonomer ratio and a high enough molecular weight.

Because the amorphous rubber decreases in molar mass on visbreaking, the starting heterophasic copolymer should be produced with a high enough rubber molar mass. The IV of AM should preferably be higher than 2 dl/g, more preferably higher than 2.5 dl/g so that the visbroken copolymers fulfill the criteria for a good impact copolymer.

Moreover, a suitably amorphous rubber is needed, which can be produced with CR>0.25.

More particularly, good impact properties at low temperatures in a visbroken PP heterophasic copolymer are determined by the amount of rubber (XS and AM in wt-%) and the rubber copolymer composition. In particular, this invention involves visbreaking of PP heterophasic copolymer where the IV of the AM$\geq$2 dl/g and $C_2$ of AM>20 wt-% (corresponding to a CR>0.25 mol/mol.), and the $C_2$ of AM<40 wt-% (corresponding to a CR<0.7 mol/mol).

DETAILED DESCRIPTION OF THE INVENTION

In this invention we define an optimized rubber composition of a heterophasic polymer for visbreaking to give good impact properties.

By "starting polymer" is meant the heterophasic polypropylene polymer which comprises a polymer matrix with a dispersed rubbery phase. The matrix in the starting propylene polymer can be a homopolymer or a random copolymer. The rubbery copolymer phase is typically a reactor blend of an amorphous rubber, a rubber-like polymer which is normally an ethylene-propylene copolymer (rubber), and a semicrystalline ethylene copolymer.

The starting polymer is produced by any convenient route with which it is possible to prepare a polymer that fulfills the intrinsic viscosity and ethylene content criteria discussed below. Typically, the process comprises a first stage, in which the polymer matrix is prepared and a second stage, where the rubbery phase is produced in the polymer matrix.

The polymerisation is typically carried out in the presence of a Ziegler-Natta type catalyst. The Ziegler-Natta type catalyst typically used in the present invention is a propylene stereospecific, high yield Ziegler-Natta catalyst. The catalyst in the second polymerisation stage is typically the same that is used in the first polymerisation stage.

The first stage polymerisation can be carried out in one or more bulk reactor(s), preferably loop reactor, or in one or more gas phase reactor(s). Typically, the reactors are connected in series.

Comonomer(s) are optionally used in any or every reactor in the first polymerisation stage. Preferably as comonomers are used $C_2$–$C_{10}$ olefins, e.g. ethylene, 1-butene, 4-methyl-1-pentene, 1-hexene, dienes, or cyclic olefins, or a mixture thereof.

The second stage polymerisation, in which the rubbery phase is polymerised in the matrix, is preferably carried out in one or more gas phase reactor(s). The second stage polymerisation is typically carried out essentially immediately after the first stage polymerisation, i.e., the polymerisation product recovered from the first polymerisation stage is conducted to the first gas phase reactor in the second polymerisation stage. The gas phase reactors in the second polymerisation zone are preferably connected in series.

Ethylene is used as comonomer in any or every reactor of the second polymerisation stage.

Hydrogen can be used in different amounts as a molar mass modifier or regulator in any or every reactor in the first and second polymerisation stage.

According to a preferred embodiment, the heterophasic propylene copolymer is produced in a reactor system comprising at least one bulk reaction zone including at least one bulk reactor and at least one gas phase reaction zone including at least one gas phase reactor. The reactors are connected in series, the bulk reaction zone being preferably arranged before the gas phase reaction zone. A separation stage can be employed between the reaction zones to prevent the carryover of reactants from the first polymerisation stage into the second one.

According to this preferred embodiment the polymer matrix is produced in the first reaction zone, which is preferably a bulk reaction zone, and the rubbery phase is produced in the second reaction zone, which preferably is a gas phase reaction zone.

In addition to the actual polymerisation reactors used, the polymerisation reaction system can also include a number of additional reactors, such as prereactors. The prereactors include any reactor for preactivating and/or prepolymerising the catalyst with propylene and/or other $\alpha$-olefin(s) and/or ethylene, if necessary. All reactors in the reactor system are preferably arranged in series.

In summary, according to the preferred embodiment of the present invention, the polymerisation of the heterophasic propylene copolymer comprises at least the following steps of subjecting propylene, and optionally comonomer(s) and/or hydrogen to polymerisation or copolymerisation in a first reaction zone or reactor in the presence of the catalyst, transferring the first polymerisation product with the reaction medium into a second reaction zone or reactor, and feeding ethylene comonomer and optionally hydrogen and/or additional propylene into the second reaction zone or reactor, continuing the polymerisation reaction in the second reaction zone in the presence of the first polymerisation product to produce a combined polymerisation product, recovering the polymerisation product from second reaction zone.

To avoid the difficulties the starting heterophasic copolymer should be produced with such a rubbery copolymer fraction where the ethylene copolymer fraction is as small as possible. This can be done by appropriate choice of catalyst, and using low comonomer ratios, preferably CR is in the range of 0.25–0.7, more preferably in the range of 0.4–0.7 (mol/mol). This low comonomer ratio gives a lower amount of ethylene copolymer and then the visbreaking to higher MFR can be carried out with less peroxide.

The starting polymer before visbreaking has IV of AM$\geq$2 dl/g, more preferably 2.5–4.5 dl/g, and $C_2$ of AM 20 wt %–40 wt %, which corresponds to a CR of 0.25–0.7. The MFR of the starting polymer is 0.1 to 60 g/10 min, usually more preferably 0.3 to 40 g/10 min. The amount of XS of the starting polymer is usually more than 10 wt-%, preferably 10 to 50 wt-%.

Furthermore, the intrinsic viscosity ratio of the rubbery phase to the matrix is suitably $\geq 1$, in other words, $IV_{rubber} \geq IV_{matrix}$.

The visbreaking is typically carried out essentially immediately after the production of the starting polymer, i.e., the product obtained from the second polymerisation stage can be conducted to visbreaking, which takes place in the pelletising stage in an extruder. It is also possible that the product of the second polymerisation stage is first pelletised, optionally stored, and the visbreaking is carried out using the pelletised product as starting material.

The visbreaking of the starting polymer, i.e., PP heterophasic copolymer to higher MFR can be carried out by standard methods with organic peroxides (e.g. Luperox 101 from Elf Atochem or Triganox 101 from Akzo) in an extruder at elevated temperature reflecting the so called half-life temperature of the chosen peroxide. Peroxides quantities of 150 to 1000 ppm are preferred, and the visbreaking is carried out at elevated temperatures of 180 to 300° C., more preferably 200 to 250° C.

The higher MFR of the product typically means MFR greater than 40 g/10 min for medium or high impact heterophasic copolymers. For super high impact copolymers with XS>20 wt-%, e.g. reactor made grades (rTPOs), the higher MFR means greater than 10 g/10 min. More generally, the visbroken copolymer is normally produced with a visbreaking ratio, $MFR_{final}/MFR_{initial}$, equal to or greater than 2, preferably at least 3 and often at least 4, which means that the MFR of the visbroken copolymer is at least 200% of the MFR of the starting polymer, preferably at least 300% and often at least 400% of the original value.

The impact properties of the visbroken polymer produced by this invention typically approximate to those of the polymer before visbreaking. In a preferred aspect, the impact properties of the visbroken polymer, notably the results for the instrument falling weight test at low temperature in accordance with ISO6603-2, with the same kind of failure as the starting polymer, are 80%, more preferably 90% of the original value.

Next, the invention will be further illustrated with the aid of the following non-limiting examples.

DESCRIPTION OF ANALYTICAL METHODS

MFR: The melt flow rate of the polymer material was determined according to ISO standard 1133 using a piston load of 2.16 kg and a temperature of 230° C.

Xylene Solubles (XS):

Determination of xylene soluble fraction (XS):

2.0 g of polymer are dissolved in 250 ml p-xylene at 135° C. under agitation. After 30±2 minutes the solution is allowed to cool for 15 minutes at ambient temperature and then allowed to settle for 30 minutes at 25±0.5° C. The solution is filtered with filter paper into two 100 ml flasks.

The solution from the first 100 ml vessel is evaporated in nitrogen flow and the residue is dried under vacuum at 90° C. until constant weight is reached.

$$XS\% = (100 \times m_1 \times v_0)/(m_0 \times v_1)$$

$m_0$=initial polymer amount (g)
$m_1$=weight of residue (g)
$v_0$=initial volume (ml)
$v_1$ volume of analysed sample (ml)

Amorphous Rubber Fraction of the Xylene Solubles (AM):
Determination of AM:

The solution from the second 100 ml flask in the xylene solubles analysis is treated with 200 ml of acetone under vigorous stirring. The precipitate is filtered and dried in a vacuumoven at 90° C.

$$AM\% = (100 \times m_2 \times v_0)/(m_0 \times v_1)$$

$m_0$=initial polymer amount (g)
$m_2$=weight of precipitate (g)
$v_0$=initial volume (ml)
$v_1$ volume of analysed sample (ml)

EXAMPLES 1–3

Preparation of the Starting PP Heterophasic Copolymers and the Visbreaking

The starting PP heterophasic copolymers were produced in a pilot plant having a loop reactor and a fluid bed gas phase reactor connected in series. The catalyst, cocatalyst and donor were fed to the loop reactor. The reactor medium was flashed away before the solid polymer containing the active catalyst entered the gas phase reactor.

The prepolymerised $MgCl_2$—supported Ti catalyst (prepared according to patent EP-A 491,566, included by references) was used in the polymerisation. Cocatalyst was triethyl aluminium (TEA) and external donor was dicyclopentanedimethoxysilane (DCPDMS). Al/Ti mole ratio was 150 and Al/donor mole ratio=2.

In the first stage (loop reactor) the PP homopolymer matrix was produced and the polymerisation was continued in the second stage (gas phase reactor) which produced the rubbery copolymer. The polymerisation temperature was 70° C. in the loop reactor and 75° C. in the gas phase reactor. The MFR of the first stage and the final product were adjusted with separate hydrogen feeds. The rubbery copolymer was produced with a low comonomer ratio, C2/C3=0.43 (mol/mol). The homopolymer matrix had a MFR of 49 g/10 min and the final copolymer had a MFR=12.1 g/10 min (after stabilisation and pelletising). Standard formulation with 1500 ppm Irganox B215 (from Ciba) and 500 ppm Ca-stearate was used.

The final copolymer had an ethene content of 7.6 wt-% (by FTIR) and a xylene soluble fraction at RT, XS=23.3 wt-% and amorphous fraction (AM) of 20.6 wt-%. The ethene content of the amorphous phase, C2 of AM was 28 wt-% and the intrinsic viscosity (IV) of the fraction measured in decaline at 135° C. according to standard procedures, IV of AM was 3.2 dl/g. (corresponding to a Mw of 480000 measured by GPC).

The copolymer was tested for mechanical properties by standard ISO tests. The results of this starting copolymer are found in Table A as ex A.

The PP heterophasic copolymer, A, was visbroken in a small twin screw extruder, BE-25 from Berstorff (screw diameter=25 mm). The pellets of the starting copolymer was soaked with a organic peroxide, 2,5-dimethyl-2,5-di(t-butyl peroxy)hexane, with trade name Triganox 101 from Akzo, at room temperature. Three levels of peroxide were used: 280, 380 and 500 ppm (ex 1–3). The pellets were then fed to the extruder using a melt temperature of 210° C. The used peroxide levels gave final copolymers with MFR of 37 g/10 min, 45 g/10 min and 66 g/ 10 min, which correspond to visbreaking ratios of 3.1, 3.8 and 5.5. By visbreaking the IV of AM dropped to 2.4 dl/g (measured in ex 2 (the IV corresponding to a Mw=280000 with a narrow MWD of 2.7).

The results of the mechanical properties of the visbroken copolymers (ex 1–3) are collected in Table A. The stiffness decreased slightly as expected and the impact dropped but stayed high also after visbreaking.

EXAMPLES 4–5

Preparation of the Starting PP Heterophasic Copolymer With a PP Random Copolymer Matrix and the Visbreaking The starting PP copolymers were produced as in examples 1–3 except that the external donor used was cyclohexyl methyl dimethoxysilane (Al/D=3) instead of DCPDMS. In the first stage the matrix polymer was now a PP random copolymer with an ethene content of 3.2 wt-% with a melting temperature of 144° C. The loop temperature was 68° C. The rubbery copolymer was produced with a comonomer ratio=0.54 (mol/mol) in the gas phase reactor. The PP random copolymer matrix had a MFR=13 g/10 min and the final copolymer had a MFR=5.1 g/10 min after pelletising. Same formulation as in examples 1–3.

The final PP heterophasic copolymer had a total ethene content of 14.6 wt-% and a XS=28.4 wt-% and AM=27.6 wt-% with a C2 of AM=28 wt-% and IV of AM=3 dl/g (corresponding to a Mw=448000 and a MWD=9.7, this fraction include also the XS (about 6–8 wt-%) of the random matrix which has a low Mw, broadening the GPC MWD).

The mechanical properties by ISO tests of the PP copolymer are collected in Table B as ex B1.

Analyses and Tests, and Abbreviation as in Examples 1–3

The copolymer, B1 was visbroken as in examples 1–3. The used peroxide amounts were 150 and 400 ppm giving a final MFR of 11.9 g/10 min and 22 g/10 min(ex 4 and 5). The visbreaking ratios were now 2.3 and 4.3. The IV of AM dropped to about 2 dl/g (the IV corresponding to the measured MW=217000 (ex 4) with the much narrower MWD=3.4 than the starting copolymer).

The measured mechanical properties of the visbroken copolymers (ex 4 and 5 ) are collected in Table B. The impact stayed high also after visbreaking.

EXAMPLE 6

Preparation of the Starting PP Heterophasic Copolymer With a PP Random Copolymer Matrix and Visbreaking The starting copolymer was produced as in examples 4–5 except that the external donor was DCPDMS as in examples 1–3. The PP random copolymer matrix was produced with an ethene content of 4 wt-%, giving a melting temperature of 138° C. The rubbery copolymer was produced as in examples 4–5. The random copolymer matrix had a MFR= 12 g/10 min and the final copolymer had a MFR=8 g/10 min (same formulation and pelletising as in examples 4–5.)

The final PP copolymer had a total ethene content of 13 wt-% and XS=28.1 wt-% and AM=24.8 wt-%. The C2 of AM was 26 wt-% and IV of AM=1.7 dl/g (lower IV because the amorphous fraction from the matrix (approximately=6 wt-%) is reducing the total IV of the rubber.)

The analyses and tests as in examples 4–5. The results are collected in Table B as in ex B2.

The PP copolymer, B2 was visbroken as in examples 4–5. The used peroxide amount was 360 ppm, giving a final MFR of 36 g/10 min(ex 6). The visbreaking ratio was 4.5. The total IV of AM dropped to 1.4 dl/g. The results of the mechanical properties of the visbroken PP copolymer (ex 6) is collected in Table B. The falling weight impact is still excellent.

EXAMPLE 7

Preparation of Starting PP Heterophasic Copolymer With a PP Random Copolymer Matrix and Visbreaking The starting PP heterophasic copolymer was produced as in example 6. The PP random copolymer matrix had a ethene content of 1.7 wt-% giving a melting temperature of 150° C. The rubbery copolymer was produced as in example 6 but with smaller XS content. The PP random copolymer matrix had a MFR=3.8 g/10 min and the final copolymer had a MFR=2.1 g/10 min.

Same Formulation and Pelletising as in Example 6

The final PP heterophasic copolymer had a total ethene content of 7.3 wt-% and the XS=15.1 wt-% and AM=12.2 wt-%. The C2 of AM was 31 wt-% and IV of AM=2.4 dl/g. Tests as in example 6 collected in Table B as ex B3.

The PP heterophasic copolymer, B3 was visbroken as in example 6 with 480 ppm peroxide. The MFR rose to 20 g/10 min with an IV of AM=1.6 dl/g (ex 7). The visbreaking ratio was 9.5.

The mechanical properties of the starting PP copolymer and the visbroken one are collected in Table B.

This low rubber content PP heterophasic copolymer had good impact as the starting PP copolymer.

EXAMPLE 8

Preparation of Starting PP Heterophasic Copolymer With a High Rubber Content and Visbreaking The starting PP heterophasic copolymer was produced as in examples 1–3 except that the amount of the rubbery copolymer in the second stage was larger. The PP homopolymer matrix had a MFR=57 g/10 min and the final PP copolymer had a MFR=4.7 g/10 min (after stabilisation and pelletising).

The final PP copolymer had an ethene content of 13.2 wt-% and the XS=34.7 and AM=33.2 wt-%. The C2 of AM was 29 wt-% and the IV of AM=4.3 dl/g (IV corresponding to a measured Mw=788000 with the MWD=5).

Tests were carried out as in example 1–3. The results of the PP copolymer are collected in Table C (as ex C).

The PP heterophasic copolymer C, was visbroken as in examples 1–3 by using same peroxide=200 ppm giving a MFR=17.2 g/10 min(ex 8). The IV of AM dropped to 2.9 corresponding now to a Mw=309000 with a narrower MWD=2.9. The visbreaking ratio was 3.7, but due to the high IV of AM higher visbreaking ratios (peroxide) could be used and still reach high stiffness/impact compared to the starting copolymer. Now the mechanical properties, stiffness/impact remained excellent down to −40° C.

COMPARISON EXAMPLE 1

Preparation of the Starting PP Heterophasic Copolymer With a Low IV of AM and Visbreaking The starting PP heterophasic copolymer was produced as in example 1–3 except that more hydrogen was used to control the Mw of the second stage of the rubbery copolymer.

The PP homopolymer matrix had a MFR=35 g/10 min and the final copolymer had a MFR=22.9 g/10 min (after stabilisation and pelletising).

The final PP copolymer had an ethene content of 3.9 wt-% and the XS=15.6 wt-% and AM=12.9 wt-%. The C2 of AM was 27 wt-% and the IV of AM=1.9 dl/g. The test results are collected in Table A (as compA1).

The PP heterophasic copolymer, compA1 was visbroken as in examples 1–3 with 250 ppm same peroxide giving a MFR rise to 52 g/10 min (compex 1) (visbreaking ratio= 2.3). The impact properties started to drop already at 0° C.

COMPARISON EXAMPLE 2

Preparation of the Starting PP Heterophasic Copolymer With a PP Random Matrix and Visbreaking With Very High Amounts of Peroxide The starting PP heterophasic copolymer was the same as in examples 4–5 in Table B as ex B1.

The heterophasic copolymer was visbroken as in examples 4–5 but the peroxide amount was 4000 ppm giving the final copolymer a MFR=330 g/10 min (compex 2) (visbreaking ratio=65). The impact properties dropped already at 0° C.

COMPARISON EXAMPLE 3

The starting PP heterophasic copolymer was the same as in example 6 in Table B as ex B2.

The heterophasic copolymer was visbroken as in example 6 but now the peroxide amount was 3000 ppm giving the final copolymer a MFR=340 g/10 min (compex 3) (visbreaking ratio=43). The impact properties started to drop at 0° C.

COMPARISON EXAMPLES 4–5

Preparation of the Starting PP Heterophasic Copolymer Produced With a High Comonomer Ratio and Visbreaking The starting PP heterophasic copolymer was produced as in examples 1–3 except that the donor was cyclohexyl methyl dimethoxysilane, Al/D=1 (Al/Ti=100). The PP homopolymer matrix was produced as in examples 1–3, but in the second stage the gas ratio was 0.85 (mol/mol). The PP homopolymer matrix had a MFR=9 g/10 min and the final PP copolymer had a MFR=3.6 g/10 min (after stabilisation and pelletising).

The final PP heterophasic copolymer had an ethene content of 12.6 wt-% and the xylene solubles, AM=18.8 wt-%. The C2 of AM was 45 wt-% and IV of AM=2.4 dl/g. The test results are collected in Table D (as ex D1).

The PP heterophasic copolymer, D1 was visbroken as in examples 1–3 with 500 and 1000 ppm of peroxide giving final copolymers with MFR=16.8 g/10 min and 34 g/10 min (compex 4–5). The good impact properties of the starting copolymer dropped for the visbroken copolymers already at room temperature. The visbreaking ratios were 4.7 and 9.4. Compared to the examples in Table A and B the peroxide consumption was bigger.

COMPARISON EXAMPLES 6–7

The starting PP heterophasic copolymer was produced as in comparison examples 4–5 except that there was used a lower hydrogen feed to the gas phase reactor resulting in a higher IV of AM (higher Mw).

The PP homopolymer matrix had a MFR of 11 g/10 min and the copolymer had a MFR=3.8 g/10 min (after stabilisation and pelletising).

The PP heterophasic copolymer had an ethene content of 12.5 wt-% and AM=16.6 wt-%. The C2 of AM was 45 wt-% and the IV of AM was 3.9 dl/g. The results are collected in Table D (as ex D2).

The heterophasic copolymer, D2 was visbroken as in comparison example 4–5 by using 500 and 1000 ppm of the peroxide giving visbroken copolymers with MFR 18.2 g/10 min and 40 g/10 min (compex 6 and 7 ). The visbreaking ratios were 4.8 and 10.5, indicating a higher peroxide consumption as in comparison examples 6–7. The good impact of the starting copolymer dropped rapidly for the visbroken copolymers already at room temperature.

In Tables A–D below the following abbreviation for the types of failure in the falling weight impact test are used.

duct=ductile
d/br=ductile/brittle (failure with yielding)
br/d=brittle/ductile (failure at yielding)
br=britt=brittle.

TABLE A

| Property | unit | standard | ex A | ex 1 | ex 2 | ex 3 | comp A1 | compex 1 |
|---|---|---|---|---|---|---|---|---|
| MFR, 2.16 kg/230 C | g/10 min | ISO1133 | 12.1 | 37 | 45.4 | 66 | 22.9 | 52 |
| Total ethene | w % | FTIR | 7.6 | | | | 3.9 | |
| Xylene solubles | | | | | | | | |
| XS | w % | | 23.3 | | 22.6 | 22.5 | 15.6 | |
| AM | w % | | 20.6 | | 20.7 | 20.3 | 12.9 | |
| C2 of AM | w % | FTIR | 28 | | | 29 | 27 | |
| IV of AM | dl/g | | 3.25 | | 2.4 | | 1.93 | |
| GPC of xylene solubles | | GPC | | | | | | |
| Mw | | | | | 281000 | | | |
| Mn | | | | | 104200 | | | |
| MWD | | | | | 2.7 | | | |
| ISO | | ISO 527-2 | | | | | | |
| Tensile modulus | Mpa | ISO527-2 | 1180 | 1120 | 1070 | 1060 | 1530 | 1410 |
| Flexural Modulus | Mpa | ISO178 | 1160 | 1080 | 1060 | 950 | 1520 | 1380 |
| Izod notched, RT | kJ/m2 | ISO180/1A | 18.5 | 13.9 | 12.5 | 10.8 | 6.7 | 5.9 |
| Izod notched, 0 C. | kJ/m2 | ISO180/1A | 13.4 | 10.6 | 9.7 | 7.9 | 5 | 4.6 |
| Izod notched, −30° C. | kJ/m2 | ISO180/1A | 9.6 | 7.8 | 7.3 | 6.2 | 4.3 | 4.2 |
| Instrum. falling impact weight 0 C | | ISO6603-2 | | | | | | |

TABLE A-continued

| Property | unit | standard | ex A | ex 1 | ex 2 | ex 3 | comp A1 | compex 1 |
|---|---|---|---|---|---|---|---|---|
| Total energy, Etot | J | | 41 | 40 | 40 | 29 | 30 | 23 |
| type of failure | | | duct (3) | duct (5) | duct (6) | d/br | d/br (6) | d/br (5) |
| | | | d/br (7) | d/br (5) | d/br (4) | | br/d (4) | br/d-br (5) |
| −20 C. | | ISO6603-2 | | | | | | |
| Total energy, Etot | J | | 40 | 41 | 37 | 26 | 26 | — |
| type of failure | | | d/br | d/br | d/br | d/br (7) | d/br (3) | |
| | | | | | | br/d (3) | br/d-br (7) | |
| Loop MFR | g/10 min | ISO1133 | 49 | | | | 35 | |
| CR = C2/C3 | mol/mol | | 0.43 | | | | 0.43 | |
| Visbreaking Peroxide/Triganox 101 | ppm | | — | 280 | 380 | 500 | — | 250 |
| Visbreaking ratio, MFR final/MFR start | | | — | 3.1 | 3.8 | 5.5 | — | 2.3 |
| Extruder melt temperature | C. | | | 210 | 210 | 210 | | 210 |
| Remarks | | | | visbr. from pellets | | | | visbr fr. pell. |

TABLE B

| Property | unit | standard | ex B1 | ex 4 | ex 5 | compex 2 | ex B2 | ex 6 | compex 3 | ex B3 | ex 7 |
|---|---|---|---|---|---|---|---|---|---|---|---|
| MFR, 2.16 kg/230 C | g/10 min | ISO1133 | 5.1 | 11.9 | 22 | 330 | 8 | 36 | 340 | 2.1 | 20 |
| Ethene in matrix | wt-% | FTIR | 3.2 | | | | ~4 | | | 1.7 | |
| Total ethene | wt-% | FTIR | 14.6 | | | | 13 | 12.8 | | 7.3 | 7.4 |
| Xylene solubles | | | | | | | | | | | |
| XS | wt-% | | 28.4 | 28.2 | 26.8 | 27 | 28.1 | 26.6 | 28 | 15.1 | 14.9 |
| AM | wt-% | | 27.6 | | 24.8 | | 24.8 | 24.6 | 24 | 12.2 | 12.6 |
| C2 of AM | wt-% | FTIR | 28 | | | | 26 | | | 31 | |
| IV of AM | dl/g | | 3 | ~2 | 1.8 | — | 1.7 | 1.42 | 1 | 2.4 | 1.6 |
| GPC of xylene solubles | | GPC | | | | | | | | | |
| Mw | | | 448000 | 217000 | | | | | | | |
| Mn | | | 46200 | 64300 | | | | | | | |
| MWD | | | 9.7 | 3.4 | | | | | | | |
| ISO | | ISO527-2 | | | | | | | | | |
| Tensile modulus | MPa | ISO527-2 | 530 | — | 480 | 410 | 520 | 460 | 410 | 1010 | 820 |
| Flexural modulus | MPa | ISO178 | 530 | | 460 | | | 430 | | 970 | 780 |
| Izod, notched, RT | kJ/m2 | ISO180/1A | 50.7 | | 44.1 | 7.5 | 34.8 | 9 | 6.7 | 11.2 | 8.7 |
| Izod, notched, 0 C | kJ/m2 | ISO180/1A | | | 15.5 | 6.4 | 8.7 | 7 | 5.2 | 4.4 | 6 |
| Izod, notched, −30 C | kJ/m2 | ISO180/1A | 9.9 | | 8.5 | 4.5 | 3.6 | 3.8 | 3.7 | | 3.9 |
| Instrum. falling weight impact 0 C. | | ISO6603-2 | | | | | | | | | |
| Total energy, Etot | J | | — | — | — | 39 | 13 | 27 | 38 | 22 | 27 | 36 |
| type of failure | | | — | — | — | ductile | br/d-br | ductile | ductile | duct (1) d/br (9) | d/br-br/d | duct (5) d/br-br |
| −20 C. | | ISO6603-2 | | | | | | | | | |
| Total energy, Etot | J | | 50 | — | 41 | 6 | 40 | 41 | 20 | 17 | 20 |
| type of failure | | | ductile | | ductile | brittle | ductile | ductile | br/d | br/d-br | br/d (6) britt (4) |
| −40 C. | | ISO6603-2 | | | | | | | | | |
| Total energy, Etot | J | | 55 | — | 44 | — | 30 | 39 | — | — | — |
| type of failure | | | ductile | | duct (9) d/br (1) | | d/br (6) br/d-br (4) | d/br | | | |
| Cast film, chill roll = 30 C. | 40 um | | | | | | | | | | |
| Film modulus, (1% sec) | MPa | ISO1184 | 260 | 260 | — | | | | | | |
| Gloss (60) | | ASTM D523 | 16 | | | | | | | | |
| Haze | % | ASTM D1003 | 62 | 43.5 | | | | | | | |
| MFR loop | g/10 min | ISO1133 | 13 | | | | 12 | | | 3.8 | |
| CR = C2/C3 | mol/mol | | | 0.54 | | | | 0.54 | | 0.54 | |
| Visbreaking Peroxide/Triganox 101 | ppm | | — | 150 | 400 | 4000 | — | 360 | 3000 | — | 480 |
| Visbreaking ratio, MFR final/MFR start | | | — | 2.3 | 4.3 | 65 | | 4.5 | 43 | — | 9.5 |

TABLE B-continued

| Property | unit | standard | ex B1 | ex 4 | ex 5 | compex 2 | ex B2 | ex 6 | compex 3 | ex B3 | ex 7 |
|---|---|---|---|---|---|---|---|---|---|---|---|
| Extruder melt temperature | C | | | 210 | 210 | 210 | | 210 | 210 | | 210 |
| Remark | | | | visbr. | from pellets | | | visbr. | from pellets | | visbr. from pellets |

TABLE C / TABLE C-continued

| Property | unit | standard | ex C | ex 8 |
|---|---|---|---|---|
| MFR, 2.16 kg/230 C | g/10 min | ISO1133 | 4.7 | 17.2 |
| Total ethene | w % | FTIR | 13.2 | |
| Xylene solubles | | | | |
| AM | wt-% | | 33.2 | 33.1 |
| XS | wt-% | | 34.7 | 34.7 |
| C2 of AM | wt-% | FTIR | 29 | |
| IV of AM | dl/g | | 4.3 | 2.35 |
| GPC of xylene solubles | | GPC | | |
| Mw | | | 788000 | 309000 |
| Mn | | | 156600 | 105200 |
| MWD | | | 5 | 2.9 |
| ISO | | ISO527-2 | | |
| Tensile modulus | Mpa | ISO527-2 | 670 | 660 |
| Flexural Modulus | Mpa | ISO178 | 660 | 630 |
| Charpy, notched, RT | kJ/m2 | ISO179/1eU | 64 P | 61 P |
| Charpy, notched, −30 C | kJ/m2 | ISO179/1eU | 10.9 | 10.8 |
| Instrum.falling weight impact | | | | |
| −20 C | | ISO6603-2 | | |
| Total energy, Etot | J | | 43 | 40 |
| Type of failure | | | ductile | ductile |
| −40 C | | ISO6603-2 | | |
| Total energy, Etot | J | | 46 | 45 |
| Type of failure | | | duct (6) | duct (2) |
| | | | d/br (4) | d/br (8) |
| Loop MFR | g/10 min | ISO1133 | 57 | |
| CR = C2/C3 | mol/mol | | 0.43 | |
| Visbreaking | | | | |
| Peroxide/Triganox 101 | ppm | | — | 200 |
| Visbreaking ratio, MFRfinal/MFRstart | | | — | 3.7 |
| extruder melt temperature | C | | | 210 |
| Remark | | | | visbr. from pellets |

TABLE D

| Property | unit | standard | ex D1 | comp ex 4 | comp ex 5 | ex D2 | comp ex 6 | comp ex 7 |
|---|---|---|---|---|---|---|---|---|
| MFR, 2.16 kg/230 C | g/10 min | ISO1133 | 3.6 | 16.8 | 34 | 3.8 | 18.2 | 40 |
| Total ethene | w % | FTIR | 12.6 | | | 12.5 | | |
| Xylene solubles | | | | | | | | |
| XS | w % | | — | | | — | | |
| AM | w % | | 18.8 | | | 16.6 | | |
| C2 of AM | w % | FTIR | 45 | | | 45 | | |
| IV of AM | dl/g | | 2.4 | | | 3.9 | | |
| ISO | | ISO527-2 | | | | | | |
| Tensile modulus | MPa | ISO527-2 | 1000 | 990 | 950 | 1020 | 990 | 980 |
| Flexural Modulus | MPa | ISO178 | 1100 | 1010 | 970 | 1060 | 1010 | 990 |
| Izod notched, RT | kJ/m2 | ISO180/1A | 44.8 | 8.7 | 6.9 | 43.7 | 9.4 | 6 |
| Izod notched, −30° C. | kJ/m2 | ISO180/1A | 5.3 | 3.7 | 3.3 | 6.4 | 4.1 | 3.5 |
| Instrum. falling weight impact RT | | ISO6603-2 | | | | | | |
| Total energy, Etot | J | | 44 | 21 | 16 | 42 | 19 | 13 |
| type of failure | | | ductile | br/d (5) br (5) | br (8) br/d (2) | ductile | br/d (6) br (4) | brittle |
| −20 C. | | ISO6603-2 | | | | | | |
| Total energy, Etot | J | | 48 | 19 | 7 | 38 | 15 | 4 |

TABLE D-continued

| Property | unit | standard | ex D1 | comp ex 4 | comp ex 5 | ex D2 | comp ex 6 | comp ex 7 |
|---|---|---|---|---|---|---|---|---|
| type of failure | | | ductile | br/d (4) br (6) | brittle | duct (5) d/br (5) | br/d (1) br (9) | brittle |
| Loop MFR | g/10 min | ISO1133 | 9 | | | 11 | | |
| CR = C2/C3 | mol/mol | | 0.85 | | | 0.85 | | |
| Visbreaking Peroxide/Triganox 101 | ppm | | — | 500 | 1000 | — | 500 | 1000 |
| Visbreaking ratio, MFR final/MFR start | | | — | 4.7 | 9.4 | — | 4.8 | 10.5 |
| Extruder temperature melt | C. | | | 210 | 210 | | 210 | 210 |
| Remarks | | | | visbr. from pellets | | | visbr. from pellets | |

What is claimed is:

1. A method of preparing a polypropylene heterophasic copolymer with good flow and impact properties, which involves visbreaking a starting polypropylene heterophasic copolymer of which the amorphous rubber, measured as xylene solubles fraction (XS) at room temperature, has an ethylene content, determined as the ethylene content of the acetone precipitated amorphous rubber fraction of the xylene soluble fraction, $C_2$ of AM, from 20 wt-% to 45 wt-%, and an intrinsic viscosity, determined as the intrinsic viscosity of the acetone precipitated amorphous rubber fraction of the xylene soluble fraction, IV of AM, of 2 dl/g or more.

2. The method according to claim 1, wherein the intrinsic viscosity of the amorphous rubber measured in decaline at 135° C. in the starting polypropylene heterophasic copolymer is 2.5–4.5 dl/g.

3. The method according to claim 1 or 2, wherein the ethylene content in the amorphous rubber is from 25 wt-% to 40 wt-%.

4. The method according to claim 1, wherein the melt flow rate (MFR) of the starting polymer is from 0.3 to 40 g/10 min.

5. The method according to claim 1, wherein the amorphous rubber (XS) comprises 10 to 50 wt-% of the starting polymer.

6. The method according to claim 1, wherein $IV_{rubber} \geq IV_{matrix}$.

7. A visbroken polypropylene heterophasic copolymer obtainable by the method according to claim 1, with a visbreaking ratio, $MFR_{final}/MFR_{initial}$, which is $\geq 2$.

8. A visbroken polypropylene heterophasic copolymer obtainable by the method according to claim 1, with a visbreaking ratio, which is at least 3.

9. The copolymer according to claim 7 or 8, which on impact testing exhibits the same type of failure as the starting polymer.

* * * * *